(12) United States Patent
Reuter et al.

(10) Patent No.: US 11,391,221 B2
(45) Date of Patent: Jul. 19, 2022

(54) MASS FLOW METERING METHOD AND SYSTEM

(71) Applicant: Hamilton Sundstrand Corporation, Charlotte, NC (US)

(72) Inventors: Charles E. Reuter, Granby, CT (US); Gerald P. Dyer, Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 15 days.

(21) Appl. No.: 17/123,479

(22) Filed: Dec. 16, 2020

(65) Prior Publication Data
US 2022/0186671 A1    Jun. 16, 2022

(51) Int. Cl.
*F02C 9/26*    (2006.01)
*G01F 1/684*   (2006.01)

(52) U.S. Cl.
CPC ............ *F02C 9/263* (2013.01); *G01F 1/6842* (2013.01); *F05D 2240/35* (2013.01); *F05D 2270/306* (2013.01); *F05D 2270/3015* (2013.01)

(58) Field of Classification Search
CPC .... F02C 9/263; F02C 9/28; F02C 7/22; F02C 9/48; F05D 2270/3015; F05D 2270/306
See application file for complete search history.

(56) References Cited

U.S. PATENT DOCUMENTS

| | | |
|---|---|---|
| 3,807,229 A | 4/1974 | Chiles |
| 3,889,535 A | 6/1975 | Bull et al. |
| 4,448,172 A | 5/1984 | Kashiwaya et al. |
| 6,938,473 B2 | 9/2005 | Iwaki et al. |
| 7,866,208 B1 | 1/2011 | Ueda et al. |
| 9,556,798 B2 | 1/2017 | Ekanayake et al. |
| 9,857,802 B2 | 1/2018 | Yates et al. |
| 10,330,023 B2 | 6/2019 | Selstad et al. |
| 2017/0246419 A1* | 8/2017 | Callaghan ............ A61M 16/203 |
| 2017/0292457 A1* | 10/2017 | Selstad ...................... F02C 9/44 |
| 2017/0321608 A1 | 11/2017 | Crowley et al. |
| 2020/0123986 A1 | 4/2020 | Hahn |
| 2020/0232962 A1* | 7/2020 | Ourliac .................. G01N 25/22 |
| 2020/0400074 A1* | 12/2020 | Seki ....................... F02M 37/08 |

FOREIGN PATENT DOCUMENTS

| | | |
|---|---|---|
| EP | 3228847 A1 | 10/2017 |
| KR | 101273776 B1 | 6/2013 |

OTHER PUBLICATIONS

European Search Report for EP Application No. 21215141.9 dated May 3, 2022.

* cited by examiner

*Primary Examiner* — Ehud Gartenberg
*Assistant Examiner* — Jacek Lisowski
(74) *Attorney, Agent, or Firm* — Carlson, Gaskey & Olds, P.C.

(57) ABSTRACT

A fuel supply system includes a low flow circuit that branches off parallel to the main flow circuit from the upstream main flow line upstream of the metering valve and has an upstream low flow line having a line connected to an orifice having an upstream side and a downstream side. The downstream side of the orifice is connected to a mass flow meter. A return low flow line is downstream of the mass flow meter and connected into the downstream main flow line at a downstream point. A controller is programmed to take in a low flow circuit mass flow measured by the mass flow meter, and calculate a main mass flow through the main flow circuit and the total mass flow delivered to the engine. A gas turbine engine and a method of operation are also disclosed.

20 Claims, 1 Drawing Sheet

MASS FLOW METERING METHOD AND SYSTEM

BACKGROUND

This application relates to a mass flow metering method and system for a fuel supply system associated with a gas turbine engine.

Gas turbine engines are known, and typically include a fan delivering air into a compressor where it is compressed. Air from the compressor is delivered into a combustor where it is mixed with fuel and ignited.

Fuel supply systems are needed for a gas turbine engine to supply the fuel to the combustor. Typically a fuel tank is connected to a fuel pump. The fuel pump delivers fuel through a metering valve, and then to the gas turbine engine. The metering valve is operable to control the amount of fuel being delivered.

It is desirable to have a method of accurately determining the mass flow from the metering valve being delivered to the gas turbine engine. An accurate determination of mass flow can improve engine performance by allowing operation closer to engine surge and flameout limits. The flameout limit is the minimum amount of fuel necessary to maintain the flame in the combustor. Accurate mass flow can also be used to calculate remaining fuel in the fuel tanks by totalizing the mass flow burned by the engine.

To date, a regulating valve maintains a relatively constant pressure drop across a metering valve metering orifice to provide this function. The metering valve positions a variable area metering orifice in the metered flow path. The metering orifice area is a function of metering valve position. The metering valve is positioned by an electronic controller. Since the metering orifice pressure drop is maintained relatively constant by the regulating valve, the nominal relationship between mass flow and metering valve position is known for an assumed fuel density. This known relationship at an assumed density can be used by an electronic controller to calculate the resulting mass flow at valve position and density.

This would be an accurate way to measure mass flow if fuel density was accurately known and no other changes occurred within the system or to conditions. However, fuel density and metering valve pressure drop can change in response to changes in conditions, such as operating conditions for the gas turbine engine. Further, degradation and repeatability of the regulating valve can have an impact on the accuracy of the metering. Often there may also be variations in fuel types which can also impact density assumptions and the resulting mass flow accuracy.

SUMMARY

A fuel supply system includes a main flow circuit having an upstream main flow line leading to a metering valve, and a downstream main flow line, downstream of the metering valve for connection to a gas turbine engine. A low flow circuit branches off parallel to the main flow circuit from the upstream main flow line upstream of the metering valve and has an upstream low flow line having a line connected to an orifice having an upstream side and a downstream side. The downstream side of the orifice is connected to a mass flow meter. A return low flow line is downstream of the mass flow meter and connected into the downstream main flow line at a downstream point. A controller is programmed to take in a low flow circuit mass flow measured by the mass flow meter, and calculate a main mass flow through the main flow circuit and the total mass flow delivered to the engine. A gas turbine engine is also taught.

These and other features may be best understood from the following drawings and specification, the following is a brief description.

DETAILED DESCRIPTION

Figure 1:
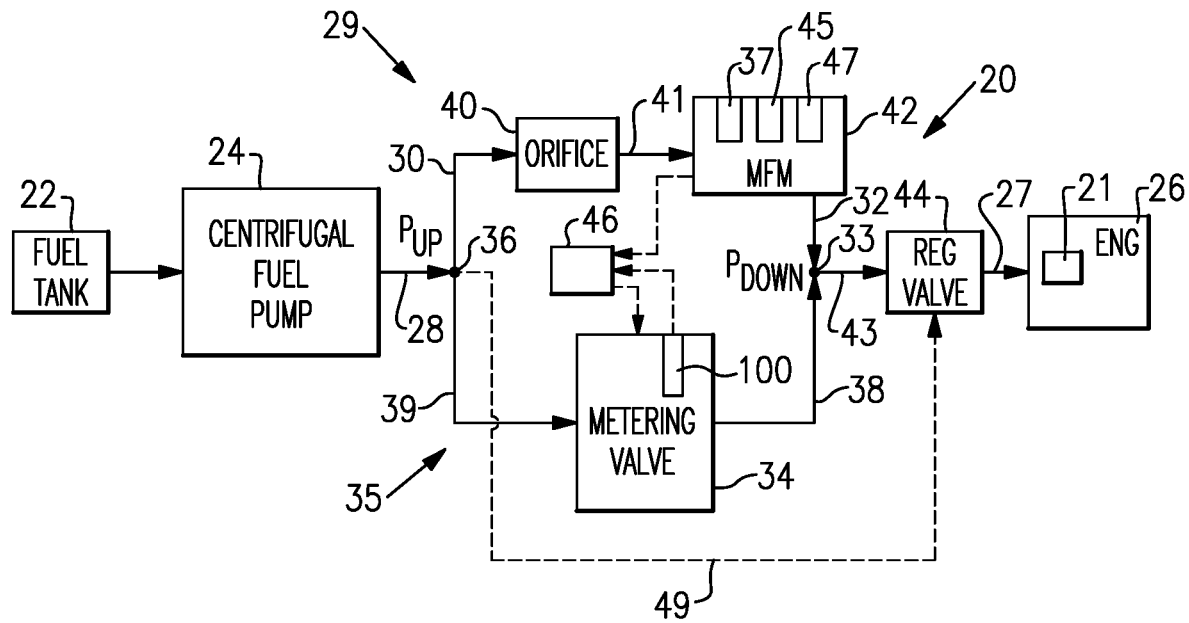
FIG. 1 is a schematic view of a system for providing mass flow metering for operation with a centrifugal main fuel pump.

FIG. 1 shows a system 20 for supplying fuel to a combustor 21 in a gas turbine engine 26. As known, the engine also has a compressor section and a turbine section. Fuel from a fuel tank 22 is delivered by a centrifugal fuel pump 24 into a flow line 28. At node 36, flow splits between a low flow circuit 29 and a parallel main flow circuit 35. The low flow line 30 branches off to a fixed orifice 40 and mass flow meter 42. A return low flow line 32 from the low flow circuit returns fuel to a downstream node 33. Main flow line 39 also branches off line 28 at node 36 to a metering valve 34. A return flow line 38 from the metering valve 34 rejoins the low flow path at node 33. At node 33 main and low flows sum and become total flow delivered to the gas turbine engine 26.

As known, there will be a pressure drop between a pressure $P_{up}$ at node 36 and $P_{down}$ at node 33. This pressure drop will be the same for both the low and main flow circuits since they share the same starting and return nodes. A fixed orifice 40 and a mass flow meter 42 are placed in the low flow circuit 29.

As known, the fixed orifice 40 may be sized to deliver the minimum quantity of fuel required by the engine, or less. This is because the low flow circuit 29 is always open.

Mass flow meter 42 measures the mass flow through the low flow circuit with the pressure differential between nodes 36 and 33 ($P_{up}-P_{down}$). Mass flow meter 42 may be any type of mass flow meter. However, in one embodiment it is a thermal dispersion flow meter, sometimes known as a hot wire flow meter.

In such a flow meter, there is an upstream temperature sensor 37, a heated probe 45 and a downstream temperature sensor 47. As fuel passes through the mass flow meter 42, the heated probe 45 provides heat into the fuel. The temperature sensor 47 can sense a change in temperature of the fuel, which is compared to a temperature sensed by temperature sensor 37. By knowing this temperature change, and the heat provided by the heated probe 45, a determination can be made of the mass flow of fuel through the mass flow meter 42.

Mass flow meters are generally most accurate over a limited flow range. Typically, mass flow meters placed on the main flow line 28, are not suitable to be used for mass flow metering as the range of volume of fuel passing through the main flow line is too great to achieve needed accuracy over the entire range.

Thus, regulating valves, such as a regulating valve 44, which is downstream of the return point 33 in combination with measured metering valve position have been relied upon to provide control of the mass flowing through the metering valve. As shown, the regulating valve 44 sees the downstream pressure $P_{down}$ from node 33 leading into the regulating valve 44 and also receives a tap 49 to the upstream pressure $P_{up}$ at node 36. The regulating valve 44 introduces a pressure drop downstream of node 36 as required to maintain a relatively fixed pressure differential between $P_{up}$ and $P_{down}$. In this embodiment the regulating valve can act in combination with the metering valve to meter the amount of mass flow passing to the engine 26.

However, as mentioned in the Background of the Invention section, there are any number of variations that can occur that will impact upon the accuracy of such a control.

As shown in embodiment 20, a control 46 controls the metering valve 34 position to provide a mass flow of fuel to the gas turbine engine 26 consistent with the operating condition of the engine 26. Typically the control 46 provides a command signal to a metering valve 34 and metering valve position from a position sensor 100 is returned to the control. The control 46 is also shown communicating with the mass flow meter 42. In this embodiment, the mass flow meter 42 will send a signal to the control 46 of the flow through the low flow circuit 29 which can then be used by the controller 46 to provide an accurate calculation of the mass flow passing through the main flow line 28 and flow to the engine 26. This will be explained below.

Figure 2:
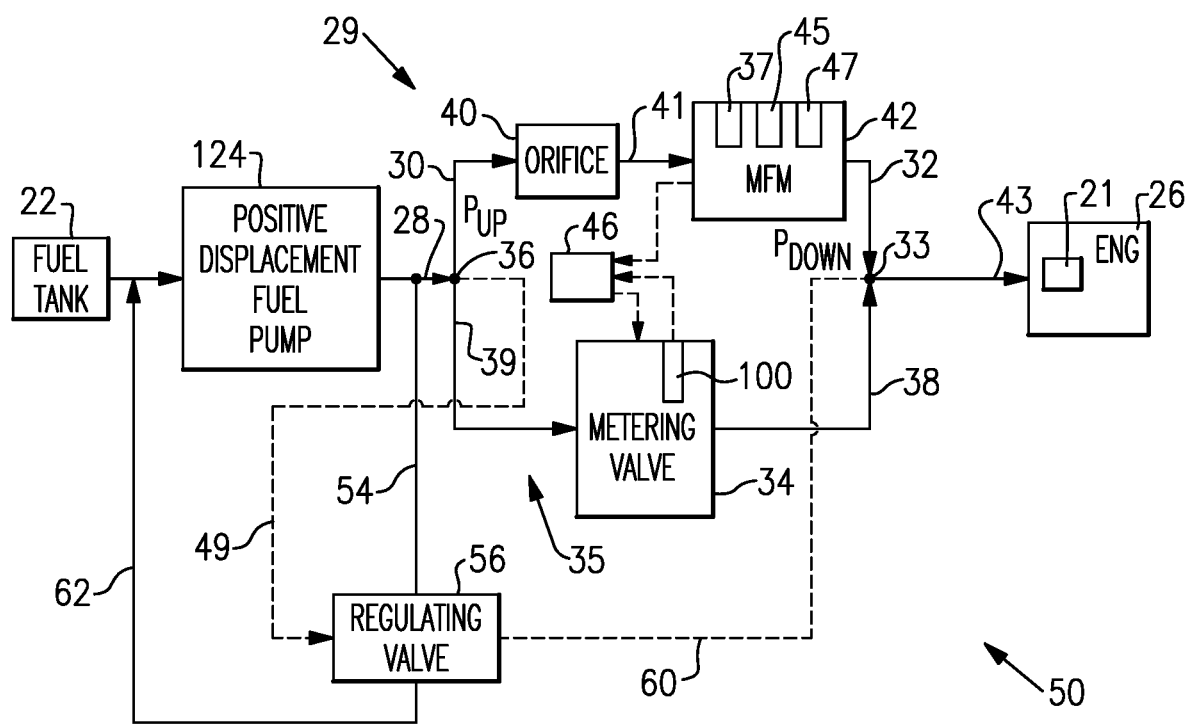
FIG. 2 shows a schematic view of a second embodiment system for providing mass flow metering for operation with a positive displacement main fuel pump.

An alternative embodiment 50 is illustrated in FIG. 2. FIG. 2 is generally the same as FIG. 1, except that the main fuel pump is a positive displacement pump 124 which requires a bypassing pressure regulating valve 56 rather than the inline type regulating valve shown in FIG. 1. Here the regulating valve 56 is not on the line 43 downstream of the metering valve 34. Instead, fuel passing downstream of the metering valve 34 joins with the low flow circuit 29 flow and passes to the gas turbine engine 26 without passing through the regulating valve 56.

Instead, the regulating valve 56 is provided on a bypass line 54 which communicates with the total pump flow line 28. The regulating valve 56 operates to regulate the pressure differential $P_{up}-P_{down}$. Regulating valve 56 ensures a constant differential pressure between a tap 60 downstream of the metering valve 34 which will be at $P_{down}$ and a tap 49 upstream of the metering valve 34 and illustrated on the bypass line 54, which would be at pressure $P_{up}$. The regulating valve 56 serves to selectively return a portion of the total pump fuel flow 62 back to a point upstream of the pump 24 to maintain a constant pressure differential $P_{up}-P_{down}$.

The orifice 40 in series with the mass flow meter 42 sees the same pressure $P_{up}$ upstream of the orifice 40, and the same pressure $P_{down}$ downstream of the mass flow meter 42, as the downstream, or return line 32 communicates back into the downstream main flow line heading to the engine at node 33. That is $P_{up}$ and $P_{down}$ will be the same on low flow and main flow circuits.

Now, the Applicant has determined a way of accurately predicting the actual mass flow through the main flow circuit 35 utilizing the mass flow through the low flow circuit 29.

A formula is utilized to define the relationship between the mass flow rate through the low flow circuit and density and $P_{up}-P_{down}$ as follows:

Mass Flow=$K*A * \text{sqrt} ((P_{up}-P_{down})*\text{density})$ which is derived from Continuity and Bernoulli's equations.

K is the flow coefficient of the orifice 40. The flow coefficient is a relative measure of an orifice's efficiency at allowing fluid flow and is a function of orifice geometry as well as upstream and downstream plumbing. The area A is the geometric area of the orifice 40.

Prior to operation of the systems 20 or 50, the K*A quantity of the low flow circuit can be determined. One way of doing this would be to measure mass flow through the low flow circuit at a known $P_{up}$, $P_{down}$ and density. From the orifice equation the quantity K*A would be determined for the low flow circuit 29 and would include effects of the orifice 40, flow meter 42 and plumbing 30, 41, 32.

Similarly K*A of the main flow circuit 35 can be determined as a function of metering valve position at a known $P_{up}$, $P_{down}$ and density. As an example, when designing the metering valve, a mass flow across the metering valve could be measured on a test rig, along with measuring the pressure drop at a known density. K can then be backed out.

Since the fluid density and pressure differential ($P_{up}-P_{down}$) across the low flow and main flow circuits are identical, the quantity sqrt (square root) $[[P_{up}-P_{down}]\text{density}]$ will be the same on both the main flow circuit and the low flow circuit. For purposes of this application, this quantity will be called the pressure-density quantity.

If K and A are known, once the mass flow on the low flow circuit 29 is measured and known it, can be utilized to easily calculate the main and total flow actual mass flow as follows:

Pressure-density quantity=$Wf$ low flow measured/($K$ low*$A$ low)

$Wf_{main\ actual}=K_{main}*A_{main}*(\text{Pressure-density quantity})$

Then:

$Wf_{total}=Wf_{main\ actual}+Wf$ low flow measured

With this method, since the low flow circuit is measuring the actual mass flow, changes in pressure-density quantity due to variations in fuel types, fuel temperature, regulator degradation and repeatability, etc. do not result in inaccurate results. Instead, since the mass flow through the low flow circuit is actually being measured and the pressure-density quantity is proportional, these variations are eliminated from calculated main and total mass flow.

The control 46 may be any type of electronic controller which is programmed to perform the operations sets forth in this application. As an example. It can be part of a full authority digital electronic control (FADEC) for the engine, or alternatively, can be a stand-alone control. Effectively, the control 46 performs the main and total mass flow calculations utilizing the low flow circuit mass flow information provided by mass flow meter 42.

A fuel supply system as disclosed could be said to include a main flow line 28 having an upstream main flow line leading to a metering valve 34, and a downstream main flow line downstream of the metering valve for connection to a gas turbine engine. A low flow line 30 is branched off from the main flow line 28 upstream of the metering valve and connected to an orifice 40 having an upstream side and a downstream side. The downstream side of the orifice is connected to a mass flow meter 42. A return low flow line 32 downstream of the mass flow meter is connected into the downstream main flow line at a downstream point 33. A controller 46 is programmed to take in a low flow line mass flow measured by the mass flow meter, and calculates a main mass flow through the main flow line.

The control determines the main mass flow by first identifying a pressure-density quantity that includes the square root of the pressure drop between the upstream and the downstream points multiplied by the fluid density. The pressure-density quantity is determined by the low flow circuit mass flow divided by a constant and the pressure-density quantity is multiplied by another constant to determine the main mass flow through the main flow circuit.

The division by the first constant and the multiplication by the second constant can be done as a single step by using a factor that take both constants into account.

A method of operating a fuel supply system for a gas turbine engine could be said to include the step of providing a main flow line 28 leading to a metering valve 34, and a downstream main flow line downstream of the metering valve connected to a gas turbine engine. A low flow line 30 is provided branched off from the main flow line 28 upstream of the metering valve and connected to an orifice 40 having an upstream side and a downstream side. The downstream side of the orifice is connected to a mass flow meter 42. A return low flow line 32 is downstream of the mass flow meter and connected into the downstream main flow line at a downstream point 33. A mass flow is measured by the mass flow meter to calculate a main mass flow through the main flow line.

The method includes the further step of determining the main mass flow by first identifying a pressure-density quantity that includes the square root of the pressure drop between the upstream and the downstream points multiplied by the fluid density. The pressure-density quantity is determined by the low flow circuit mass flow divided by a constant and the pressure-density quantity is multiplied by another constant to determine the main mass flow through the main flow circuit.

Although an embodiment has been disclosed, a worker of ordinary skill in this art would recognize that certain modifications could come within the scope of this disclosure. For these reasons, the following claims should be studied to determine the true scope and content of this disclosure.

What is claimed is:

1. A fuel supply system comprising:
    a main flow circuit having an upstream main flow line leading to a metering valve, and a downstream main flow line downstream of the metering valve for connection to a gas turbine engine;
    a low flow circuit branched off from the upstream main flow line at an upstream point upstream of the metering valve and having an upstream low flow line connected to an orifice having an upstream side and a downstream side, and the downstream side of the orifice being connected to a mass flow meter, a return low flow line downstream of the mass flow meter and connected to loin the downstream main flow line at a downstream point; and
    a controller programmed to take in a low flow circuit mass flow measured by the mass flow meter, and calculate a main mass flow through the main flow circuit.

2. The fuel supply system as set forth in claim 1, wherein the controller determines the main mass flow by first identifying a pressure-density quantity that includes a square root of a pressure drop between the upstream and the downstream points multiplied by a fluid density, the pressure-density quantity being determined by the low flow circuit mass flow being divided by a first constant and the pressure-density quantity being multiplied by a second constant to determine the main mass flow through the main flow circuit.

3. The fuel supply system as set forth in claim 2, wherein there is a fuel pump upstream of the location where the low flow circuit branches off the main flow circuit.

4. The fuel supply system as set forth in claim 1, wherein there is a regulating valve downstream of the downstream point where the return low flow line returns into the downstream main flow line, the regulating valve serving to limit an amount of fuel passing from the downstream main flow line to the gas turbine engine.

5. The fuel supply system as set forth in claim 1, wherein there is a bypass tap on the upstream main flow line upstream of the metering valve, the bypass tap passing through a regulating valve serving to limit fuel flow reaching the gas turbine engine by selectively returning a portion of the fuel flow to a location upstream of a fuel pump.

6. The fuel supply system as set forth in claim 1, wherein the mass flow meter is a thermal dispersion flow meter having a heated element and at least one temperature sensor.

7. A gas turbine engine comprising:
    a compressor, a combustor, a turbine, and a fuel supply system;
    the fuel supply system supplying fuel to the combustor, the fuel supply system having a main flow circuit having an upstream main flow line leading to a metering valve, and a downstream main flow line downstream of the metering valve for connection to the combustor;
    a low flow circuit branched off from the upstream main flow line at an upstream point upstream of the metering valve and having an upstream low flow line connected to an orifice having an upstream side and a downstream side, and the downstream side of said orifice being connected to a mass flow meter, a return low flow line downstream of the mass flow meter and connected to loin the downstream main flow line at a downstream point; and
    a controller programmed to take in a low flow circuit mass flow measured by the mass flow meter, and calculate a main mass flow through the main flow circuit.

8. The gas turbine engine as set forth in claim 7, wherein the controller determines the main mass flow by first identifying a pressure-density quantity that includes a square root of a pressure drop between the upstream and the downstream points multiplied by a fluid density, the pressure-density quantity being determined by the low flow circuit mass flow being divided by a first constant and the pressure-density quantity being multiplied by another constant to determine the main mass flow through the main flow circuit.

9. The gas turbine engine as set forth in claim 8, wherein there is a fuel pump upstream of the location where the low flow circuit branches off the main flow circuit.

10. The gas turbine engine as set forth in claim 9, wherein the mass flow meter is a thermal dispersion flow meter having a heated element and at least one temperature sensor.

11. The gas turbine engine as set forth in claim 7, wherein there is a regulating valve downstream of the downstream point where the return low flow line returns into the downstream main flow line, the regulating valve serving to limit an amount of fuel passing from the downstream main flow line to the gas turbine engine.

12. The gas turbine engine as set forth in claim 7, wherein there is a bypass tap on the upstream main flow line upstream of the metering valve, the bypass tap passing through a regulating valve serving to limit fuel flow reaching the gas turbine engine by selectively returning a portion of the fuel flow to a location upstream of a fuel pump.

13. The gas turbine engine as set forth in claim 7, wherein the mass flow meter is a thermal dispersion flow meter having a heated element and at least one temperature sensor.

14. A method of operating a fuel supply system for a gas turbine engine including the step of:

providing a main flow circuit having an upstream main flow line leading to a metering valve, and a downstream main flow line downstream of the metering valve connected to the gas turbine engine;

providing a low flow circuit branched off from the upstream main flow line at an upstream point upstream of the metering valve and having an upstream low flow line connected to an orifice having an upstream side and a downstream side, and the downstream side of the orifice being connected to a mass flow meter, a return low flow line downstream of the mass flow meter and connected to join the downstream main flow line at a downstream point; and using a low flow circuit mass flow measured by the mass flow meter to calculate a main mass flow through the main flow circuit.

15. The method as set forth in claim 14, including the further step of determining the main mass flow by first identifying a pressure-density quantity that includes a square root of a pressure drop between the upstream and the downstream points multiplied by a fluid density, the pressure-density quantity being determined by the low flow circuit mass flow being divided by a first constant and the pressure-density quantity being multiplied by a second constant to determine the main mass flow through the main flow circuit.

16. The method as set forth in claim 15, wherein the first constant is determined by measuring mass flow through the low flow circuit at a known pressure drop and a known fluid density, and the second constant is determined as a function of a known position of the metering valve at said known pressure drop and said known fluid density.

17. The method as set forth in claim 15, wherein the mass flow meter is a thermal dispersion flow meter having a heated element and at least one temperature sensor.

18. The method as set forth in claim 14, wherein there is a regulating valve downstream of the downstream point where the return low flow line returns into the downstream main flow line, the regulating valve serving to limit an amount of fuel passing from the downstream main flow line to the gas turbine engine.

19. The method as set forth in claim 14, wherein there is bypass tap on the upstream main flow line upstream of the metering valve, the bypass tap passing through a regulating valve serving to limit fuel flow reaching the gas turbine engine by selectively returning a portion of the fuel flow to a location upstream of a fuel pump.

20. The method as set forth in claim 14, wherein the mass flow meter is a thermal dispersion flow meter having a heated element and at least one temperature sensor.

* * * * *